United States Patent [19]

Musser et al.

[11] 3,865,865

[45] Feb. 11, 1975

[54] SELECTIVE REMOVAL OF 2-PENTENENITRILE AND 2-METHYL-2-BUTENENITRILE FROM 3-PENTENENITRILE

[75] Inventors: Michael T. Musser, Wilmington, Del.; Andrew Streitwieser, Jr., Berkeley, Calif.

[73] Assignee: E. I. du Pont de Nemours and Company, Wilmington, Del.

[22] Filed: Feb. 1, 1974

[21] Appl. No.: 438,941

Related U.S. Application Data

[63] Continuation-in-part of Ser. No. 332,580, Feb. 15, 1973, abandoned.

[52] U.S. Cl. .............................................. 260/465.9
[51] Int. Cl. ........................................... C07c 121/30
[58] Field of Search ................................... 260/465.9

[56] References Cited
UNITED STATES PATENTS

| | | | |
|---|---|---|---|
| 2,784,218 | 3/1957 | McDonald | 260/465.9 |
| 3,522,288 | 7/1970 | Drinkard, Jr. et al. | 260/465.9 X |
| 3,526,654 | 9/1970 | Hildebrand | 260/465.9 |
| 3,564,040 | 2/1971 | Downing et al. | 260/465.9 |
| 3,595,901 | 7/1971 | Smith | 260/465.9 |
| 3,676,481 | 7/1972 | Chio | 260/465.9 |
| 3,697,578 | 10/1972 | Pasquino et al. | 260/465.9 |
| 3,739,011 | 6/1973 | Drinkard, Jr. | 260/465.9 |
| 3,752,839 | 8/1973 | Drinkard, Jr. et al. | 260/465.9 X |
| 3,766,241 | 10/1973 | Drinkard, Jr. et al. | 260/465.9 X |

*Primary Examiner*—Joseph P. Brust

[57] ABSTRACT

A process for selectively removing 2-pentenenitrile as well as 2-methyl-2-butenenitrile from a mixture of alkenyl nitriles containing predominantly 3-pentenenitrile by contacting the mixture of nitriles with a treating agent comprising an aqueous solution wherein sulfite and bisulfite ions are present, said solution having a pH of 3.0 to 11.0 to produce an aqueous phase containing the bisulfite adduct of 2-pentenenitrile and/or 2-methyl-2-butenenitrile and an organic phase comprising predominantly 3-pentenenitrile, separating the aqueous and organic phases and recovering 3-pentenenitrile substantially free of 2-pentenenitrile and 2-methyl-2-butenenitrile from the organic phase.

12 Claims, No Drawings

3,865,865

SELECTIVE REMOVAL OF 2-PENTENENITRILE AND 2-METHYL-2-BUTENENITRILE FROM 3-PENTENENITRILE

CROSS REFERENCE TO RELATED APPLICATION

This is a continuation-in-part of patent application Ser. No. 332,580, filed on Feb. 15, 1973 now abandoned by Michael T. Musser and Andrew Streitwieser, Jr.

BACKGROUND OF THE INVENTION

In the preparation of the highly important polyamide intermediate, adiponitrile, by hydrocyanation, butadiene is reacted with hydrogen cyanide to produce a mixture of alkenyl nitriles, the branched chain nitriles are isomerized to linear alkenyl nitriles and the linear nitriles, predominantly 3-pentenenitrile along with 4-pentenenitrile, are further hydrocyanated to produce organic dinitriles, in particular, adiponitrile, as described in U.S. Pats. Nos. 3,496,215, 3,496,217, 3,496,218 and 3,536,748. In these processes, there is also produced some 2-pentenenitrile as well as 2-methyl-2-butenenitrile. These are undesirable by-products in the feed stock for hydrocyanation to adiponitrile in that they are detrimental to catalyst efficiency.

Difficulty is encountered in trying to remove such nitriles as 2-pentenenitrile or 2-methyl-2-butenenitrile by procedures such as distillation in that the boiling points of the several nitriles are close together. A process described in U.S. Pat. No. 3,564,040 involves isomerizing trans-2-pentenenitrile to cis-2-pentenenitrile, which has a greater difference in boiling point from that of 3-pentenenitrile than does trans-2-pentenenitrile. However, this process also requires careful fractional distillation to produce an acceptable feed stock for the further hydrocyanation to the desired adiponitrile and a simpler, more effective process has been desired.

SUMMARY OF THE INVENTION

It has now been found that 2-pentenenitrile and 2-methyl-2-butenenitrile can be selectively separated from a mixture of alkenyl nitriles comprising 2-pentenenitrile, 2-methyl-2-butenenitrile, 3-pentenenitrile and a minor amount of 4-pentenenitrile by contacting the mixture of nitriles with an aqueous solution of a treating agent comprising sulfite and bisulfite ions at a total concentration of about 0.1 to 5 molar and alkali metal or ammonium cations to produce an aqueous phase containing the bisulfite adduct of 2-pentenenitrile and/or 2-methyl-2-butenenitrile and an organic phase containing 3-pentenenitrile and recovering the 3-pentenenitrile substantially free of 2-pentenenitrile or 2-methyl-2-butenenitrile. The bisulfite adduct of 2-pentenenitrile or 2-methyl-2-butenenitrile can be recovered or isolated from the aqueous phase and thereafter subjected to an elevated temperature to decompose the bisulfite adduct into 2-pentenenitrile or 2-methyl-2-butenenitrile and a mixture of alkali metal or ammonium sulfite and bisulfite; the alkali metal or ammonium sulfite and bisulfite can be recycled to the process, and the 2-pentenenitrile or 2-methyl-2-butenenitrile can be readily isolated for suitable disposal.

The aqueous solution of a treating agent of this invention comprises sulfite and bisulfite ions and alkali metal or ammonium cations. At the pH range of this invention there are always present in the aqueous solution of the treating agent both sulfite and bisulfite ions in varying degrees depending on whether the pH is at the lower or higher extreme. The desired ions in the aqueous solution can be achieved by adding various compounds to water. Representatives of such compounds include alkali metal bisulfites; ammonium bisulfite; ammonium sulfite; mixtures of ammonium sulfite, ammonium bisulfite and an alkali metal bisulfite; mixtures of an alkali metal bisulfite and an alkali metal sulfite; sulfur dioxide and an alkali metal hydroxide; sulfur dioxide and ammonium hydroxide; sulfur dioxide and an alkali metal bisulfite; sulfur dioxide and an alkali metal sulfite; sulfur dioxide and ammonium bisulfite; sulfur dioxide and ammonium sulfite; any protonic acid and an alkali metal bisulfite; any protonic acid and an alkali metal sulfite; any protonic acid and ammonium sulfite; and any protonic acid and ammonium bisulfite. The invention, therefore, requires the presence of a mixture of bisulfite and sulfite ions in the aqueous solution within a certain pH range and said mixture of ions can be achieved a variety of ways. The preferred method of obtaining the mixture of bisulfite and sulfite ions in the aqueous solution for economic reasons is by using sulfur dioxide and sodium hydroxide.

The aqueous solution of a reacting agent of this invention should have a pH in the range of from 3 to 11 and preferably in the range of from 4.5 to 9.0. It will be apparent that at a pH of 3.0 the aqueous solution of this invention contains mostly bisulfite ions and small amounts of sulfite ions while at a pH of 11.0 the aqueous solution contains mostly sulfite ions and small amounts of bisulfite ions. Thus the amounts of each ion present varies as the pH moves from 3.0 to 11.0.

The concentration of the bisulfite and sulfite ions in the aqueous solution of the treating agent of this invention should be in the range of from 0.1 molar to 5 molar and preferably in the range of 0.5 to 3 molar.

The process of the present invention is carried out at a temperature in the range of from 20°–200°C. and preferably in the range of about 60°–100°C.

The time required for contacting the aqueous solution of a treating agent of this invention with the nitrile mixtures is from one minute to 24 hours, preferably in the range of from about 5 minutes to 12 hours. The required contact time is less at higher pH's of the aqueous solution. The reaction that occurs between the aqueous solution and the nitriles increases in rate as the pH increases.

The process of the present invention can be carried out at any pressure where the aqueous solution can exist as a liquid.

The decomposition of the mixed sulfite and bisulfite/nitrile adduct can be carried out at a temperature in the range of 125°–400°C. and preferably in the range of 175°–250°C. Decomposition can be accomplished in a period of about two minutes to 24 hours; a preferred period is about 15 minutes to three hours. The isolation of the 2-pentenenitrile or the 2-methyl-2-butenenitrile from the sulfite and bisulfite mixture can thereafter be carried out at atmospheric pressure and optionally with a carrier gas such as nitrogen, air, or steam, or it can also be done under reduced pressure such as 0.1 to 300 Torr. The mixed sulfite and bisulfite recovered can be recycled to the process. The recovered 2-pentenenitrile or 2-methyl-2-butenenitrile may be disposed of as desired.

DESCRIPTION OF PREFERRED EMBODIMENTS

The invention is more fully illustrated in the examples to follow. Examples 1–10 are concerned with separation of 2-pentenenitrile and 2-methyl-2-butenenitrile from the nitrile mixture by formation of the bisulfite adduct; Examples 11–13 illustrate the further step of decomposing the adduct to the bisulfite and nitrile moieties.

EXAMPLE 1

To a one-liter three-necked round-bottom flask equipped with overhead stirrer, water condenser topped with a dry ice condenser, thermocouple, and heating mantle was charged 45.0 g. sodium bisulfite, 27.3 g. sodium sulfite, and 500 cc. of water. The solution (pH - 6.5) was stirred and heated to 80°C. and then a 100 cc. mixture of pentenenitriles and butenenitriles was added. To the mixture there was also added 5 cc. butylbenzene to serve as an analytical standard. Samples of the organic phase were removed periodically and analyzed by vapor phase chromatography (VPC). Composition of the organic phase at the outset (0 time) and at various time intervals is shown in Table I to follow.

TABLE I

| TIME | 0 | ¼ hr | ½ hr | ¾ hr | 1 hr | 2 hr | 3 hr | 5 hr | 15 sec |
|---|---|---|---|---|---|---|---|---|---|
| % t-2M2BN* | 4.34 | 4.93 | 4.85 | 4.71 | 4.44 | 3.90 | 3.23 | 2.81 | 4.41 |
| % c-2M2BN* | 4.47 | 4.90 | 4.91 | 4.71 | 4.45 | 3.77 | 2.96 | 1.86 | 4.51 |
| % c-2PN* | 8.97 | 2.28 | 0.26 | — | — | — | — | — | 8.87 |
| % t-2PN* | 9.08 | 3.04 | 0.64 | — | — | — | — | — | 9.16 |
| % t-3PN* | 57.60 | 65.87 | 69.62 | 70.61 | 70.78 | 71.70 | 72.59 | 73.46 | 56.76 |
| % c-3PN* | 4.08 | 4.59 | 4.80 | 4.87 | 4.92 | 5.00 | 5.14 | 5.39 | 3.89 |
| % 4PN* | 0.83 | 0.83 | 0.69 | 0.75 | 0.76 | 0.73 | 0.71 | 0.71 | 0.71 |
| % butyl benzene | 10.64 | 13.57 | 14.23 | 14.36 | 14.64 | 14.90 | 15.37 | 16.06 | 11.68 |
| 2PN/Std | 1.700 | 0.392 | 0.063 | — | — | — | — | — | 1.544 |
| 2M2BN/Std | 0.827 | 0.725 | 0.686 | 0.656 | 0.608 | 0.514 | 0.402 | 0.272 | 0.764 |
| 3PN+4PN/Std | 5.876 | 5.255 | 5.279 | 5.309 | 5.224 | 5.198 | 5.104 | 4.954 | 5.255 |

Legend:
*t-2M2BN = trans-2-methyl-2-butenenitrile; c-2M2BN = cis-2-methyl-2-butenenitrile c-2PN = cis-2-pentenenitrile; t-2PN = trans-2-pentenenitrile; t-3PN = trans-3-pentenenitrile; c-3PN = cis-3-pentenenitrile; 4PN = 4-pentenenitrile.

The purpose of the experiment under the heading "15 sec" (Table I, last column) was to determine the stability of 3-pentenenitrile and 4-pentenenitrile to the reaction conditions; i.e. are they isomerized to 2-pentenenitrile and then removed by further reaction with bisulfite. The stability can be determined by measuring the ratio of 3 + 4 pentenenitrile to standard (3PN+4PN/Std). The sudden initial drop from 5.876 to 5.255 is not due to the loss of pentenenitrile but rather their solubility in the aqueous phase as compared to the solubility of the standard in the aqueous phase. This was shown by the 15 sec point in which the starting solution (time = 0) was shaken for 15 seconds with distilled water — no sulfite/bisulfite present — and then analyzed. The ratio of 3+4PN/Std is the same as after ¼ hour of reaction time.

EXAMPLE 2

A system similar to Example 1 was used except that sodium sulfite was omitted. The pH of the aqueous solution was 5.2. The reaction was run at 100°C., and the organic phase initially contained 43.8% 2-pentenenitrile. All of the 2-pentenenitrile was removed from the organic phase in less than 3 hours.

EXAMPLE 3

A reaction procedure similar to that of Example 1 was used except that the aqueous phase comprised 26 g. of sodium bisulfite in 250 cc. of water and saturated with sulfur dioxide, giving a pH of 4.6. Analysis by V.P.C. of the final organic phase indicated 60% removal of 2-pentenenitrile in 6 hours.

EXAMPLE 4

A reaction procedure similar to Example 1 was used except that the aqueous phase comprised 26 g. of sodium hydroxide in 500 cc. of water to which sulfur dioxide had been added to adjust the pH to 6.5. All of the 2-pentenenitrile was removed within 45 minutes.

EXAMPLE 5

The reaction procedure was similar to Example 1 except that the aqueous phase comprised 81.9 g. of sodium sulfite in 480 cc. of water and adjusted to pH 6.5 with aqueous hydrochloric acid. All of the 2-pentenenitrile was removed in less than 15 minutes.

EXAMPLE 6

The reaction procedure was similar to that of Example 1 except that the aqueous phase comprised 81.9 g. of sodium sulfite in 500 cc. of water and adjusted to pH 6.5 with sulfur dioxide. All of the 2-pentenenitrile was removed in less than 15 minutes.

EXAMPLE 7

The reaction procedure was similar to that of Example 1 except that the aqueous phase comprised 36.1 g. of potassium hydroxide, 500 cc. of water and adjusted to pH 6.5 with sulfur dioxide. All of the 2-pentenenitrile was removed in less than 15 minutes.

EXAMPLE 8

The reaction procedure was similar to that of Example 1 except that the aqueous phase comprised 150 cc. of concentrated ammonium hydroxide and 150 cc. of water adjusted to pH 7.8 with sulfur dioxide. All of the 2-pentenenitrile was removed in less than 1 hour.

EXAMPLE 9

The reaction procedure was similar to that of Example 1 except that the aqueous phase comprised 45 g. of ammonium sulfite in 300 cc. of water, the solution having a pH of about 9.0. All of the 2-pentenenitrile was removed in less than 40 minutes.

EXAMPLE 10

The reaction procedure was similar to that of Example 1 except that the aqueous solution comprised 30 g.

of sodium bisulfite, 10 g. of sodium sulfite and 250 cc. of water (pH 6.5) and that 2-methyl-2-butenenitrile was removed from a mixture with 2-methyl-3-butenenitrile. The 2-methyl-2-butenenitrile was 50% removed in 16 hours.

EXAMPLES 11–13

As indicated above, the further step of decomposing the bisulfite/alkenyl nitrile adduct to the bisulfite and nitrile moieties is shown in these examples to follow; Example 11 illustrating the use of steam as a carrier gas, Example 12 illustrating decomposition carried out under reduced pressure and Example 13 showing the use of nitrogen carrier gas.

EXAMPLE 11

To a 250 cc. round-bottom flask, immersed in an oil bath, and fitted with a short neck wrapped with a heating tape, and topped with a distillation head, was charged 10 g. of 2-pentenenitrile/sodium bisulfite adduct and 10 cc. of water. The shape of the neck was in the form of an "S" laid on its side, so that any liquid condensing in the distillation head could not drop back into the reaction flask. The oil bath was heated to 250°C. and the neck of the flask to 160°C. for 1 hour. During the course of the reaction, water was fed directly into the pot, using a syringe pump, at a rate of 0.21 cc./minute. The water evaporated upon hitting the hot walls of the flask and acted as a carrier gas to remove the 2-pentenenitrile as it was formed.

The resulting overhead liquid contained two phases of which the upper phase was a pale yellow liquid measuring 4.0 cc. and which was analyzed by V.P.C. as 97% 2-pentenenitrile. The lower aqueous phase measured 24.8 cc; analysis of two samples by Raman spectroscopy gave the values 0.84% and 0.92% for 2-pentenenitrile. The remaining light gray pot residue weighed 4.3 g., and analyzed by infrared spectroscopy as being about 35% unconverted adduct and 65% sodium sulfite. An elemental analysis on these solids indicated: %Na, 33.55, 35.22; %O, 38.92, 37.15, 36.71; %C, 7.76; 7.65; %S, 24.37, 21.33. The material balance on 2-pentenenitrile was 103% using the elemental analysis results, or 112% using the infrared results.

EXAMPLE 12

This experiment followed the procedure of Example 11 except that the reaction was carried out under reduced pressure (15 Torr) instead of feeding water to the reaction flask. The decomposition to 2-pentenenitrile, sodium sulfite, and sulfur dioxide appeared to be complete in less than 4-½ hours at 210°C.

EXAMPLE 13

The use of nitrogen as a carrier gas to remove the regenerated nitrile is illustrated in the following experiment. A sample of 2-pentenenitrile/sodium bisulfite adduct (120.8 mg.) contained in a distillation tube was placed in an oven programmed from ambient temperature to 230°C. at a rate of 5°C./min. while nitrogen was passed over the sample. Off-gases were passed through a wet ice trap and uncondensed gases were collected in a one-meter IR gas cell. Results by IR analysis of materials condensed in the wet ice trap and collected in the gas cell were as follows: $SO_2$, 17.4 mg.; $H_2O$, 11.3 mg., cis-2PN, 12 mg.; trans-2PN, 27.4 mg.

A residue of $Na_2SO_3$ (45.3 mg.) remained in the distillation tube. Sublimate deposited in the upper part of the distillation tube (1.6 mg.) was identified as $CH_3CH_2CH=CH-CONH_2$.

What is claimed is:

1. A process for the recovery of 3-pentenenitrile substantially free of 2-pentenenitrile and 2-methyl-2-butenenitrile by the selective removal of 2-pentenenitrile and 2-methyl-2-butenenitrile from a mixture of alkenyl nitriles comprising 2-pentenenitrile and 2-methyl-2-butenenitrile and 3-pentenenitrile and 4-pentenenitrile which comprises contacting the mixture of nitriles with an aqueous solution of a treating agent consisting essentially of a compound selected from the group consisting of an alkali metal sulfite, an alkali metal bisulfite, ammonium sulfite, ammonium bisulfite and mixtures thereof, the sulfite and bisulfite total concentration being about 0.1 to about 5 molar for a period of from about 1 minute to 24 hours, the solution having a pH in the range of 3 to 11, at a temperature in the range of 20°C. to 200°C. to produce an aqueous phase containing an adduct selected from the group consisting of a water-soluble bisulfite adduct of 2-pentenenitrile, a water-soluble bisulfite adduct of 2-methyl-2-butenenitrile and mixtures thereof and an organic phase comprising 3-pentenenitrile; separating the aqueous phase from the organic phase and recovering 3-pentenenitrile substantially free of 2-pentenenitrile and 2-methyl-2-butenenitrile from the organic phase.

2. The process of claim 1 wherein the mixtures of nitriles and the aqueous solution of treating agent are contacted for about 5 minutes to about 12 hours.

3. The process of claim 1 wherein the treating agent is sodium bisulfite.

4. The process of claim 1 wherein the treating agent is ammonium bisulfite.

5. The process of claim 1 wherein the temperature is in the range of about 60°C. to about 100°C.

6. The process of claim 1 wherein the pH is in the range of 4.5 to 9.0.

7. The process of claim 1 wherein the bisulfite adduct with the alkenyl nitrile from the aqueous phase is thereafter subjected to a temperature in the range of 125°C. to 400°C. for a period from about 2 minutes to 24 hours to decompose the bisulfite adduct into the alkenyl nitrile and a mixture of the alkali metal or ammonium sulfite and bisulfite recovering the alkenyl nitrile and alkali metal or ammonium sulfite and bisulfite separately and recycling the alkali metal or ammonium sulfite and bisulfite.

8. The process of claim 7 wherein the bisulfite adduct with the alkenyl nitrile is subjected to temperature in the range of 175°C. to 250°C.

9. The process of claim 7 wherein the alkenyl nitrile is 2-pentenenitrile.

10. The process of claim 7 wherein the alkenyl nitrile is 2-methyl-2-butenenitrile.

11. The process of claim 1 wherein the treating agent is sodium sulfite.

12. The process of claim 1 wherein the treating agent is ammonium sulfite.

* * * * *